United States Patent
Bancel

(10) Patent No.: US 9,483,663 B2
(45) Date of Patent: Nov. 1, 2016

(54) COUNTERMEASURE METHOD FOR PROTECTING STORED DATA

(75) Inventor: Frédéric Bancel, Senas (FR)

(73) Assignee: STMicroelectronics (Rousset) SAS, Rousset (FR)

(*) Notice: Subject to any disclaimer, the term of this patent is extended or adjusted under 35 U.S.C. 154(b) by 327 days.

(21) Appl. No.: 12/849,130

(22) Filed: Aug. 3, 2010

(65) Prior Publication Data

US 2011/0033045 A1 Feb. 10, 2011

(30) Foreign Application Priority Data

Aug. 5, 2009 (FR) ........................ 09 03865

(51) Int. Cl.
| | | |
|---|---|---|
| G06F 21/00 | (2013.01) | |
| G06F 21/78 | (2013.01) | |
| G06F 21/55 | (2013.01) | |
| G06F 21/62 | (2013.01) | |
| H04L 9/00 | (2006.01) | |
| H04L 9/08 | (2006.01) | |

(52) U.S. Cl.
CPC ............ *G06F 21/78* (2013.01); *G06F 21/558* (2013.01); *G06F 21/62* (2013.01); *H04L 9/003* (2013.01); *H04L 9/004* (2013.01); *H04L 9/0869* (2013.01); *G06F 2221/2107* (2013.01); *H04L 2209/12* (2013.01)

(58) Field of Classification Search
CPC ...... G06F 21/78; G06F 21/558; G06F 21/62; G06F 2221/2107; H04L 9/003; H04L 9/004; H04L 9/0869; H04L 2209/12

USPC ............................................. 380/44; 713/193
See application file for complete search history.

(56) References Cited

U.S. PATENT DOCUMENTS

| | | | | |
|---|---|---|---|---|
| 5,146,498 | A | * | 9/1992 | Smith ........................... 380/273 |
| 6,996,723 | B1 | * | 2/2006 | Kyojima et al. .............. 713/193 |
| 7,110,539 | B1 | | 9/2006 | Bao et al. |
| 2004/0179690 | A1 | * | 9/2004 | Soliman ........................ 380/277 |
| 2005/0114653 | A1 | * | 5/2005 | Sudia ............................ 713/158 |
| 2006/0212506 | A1 | * | 9/2006 | Vasyltsov ...................... 708/620 |
| 2009/0028143 | A1 | * | 1/2009 | Eswaran et al. .............. 370/389 |

FOREIGN PATENT DOCUMENTS

| | | |
|---|---|---|
| JP | 2007195132 A | 2/2007 |
| WO | 03/085881 A1 | 10/2003 |
| WO | 2007/069236 A2 | 6/2007 |

OTHER PUBLICATIONS

International Search Report mailed Dec. 8, 2010, for corresponding Application No. EP 10 00 7904, 9 pages.

* cited by examiner

*Primary Examiner* — Michael Pyzocha
(74) *Attorney, Agent, or Firm* — Seed IP Law Group PLLC

(57) ABSTRACT

A method of read or write access by an electronic component of data, including generating a first secret key for a first data of an ordered list of data to access, and for each data of the list, following the first data, generating a distinct secret key by means of a deterministic function applied to a secret key generated for a previous data of the list, and the application of a cryptographic operation to each data to be read or to be written of the list, carried out by using the secret key generated for the data.

25 Claims, 4 Drawing Sheets

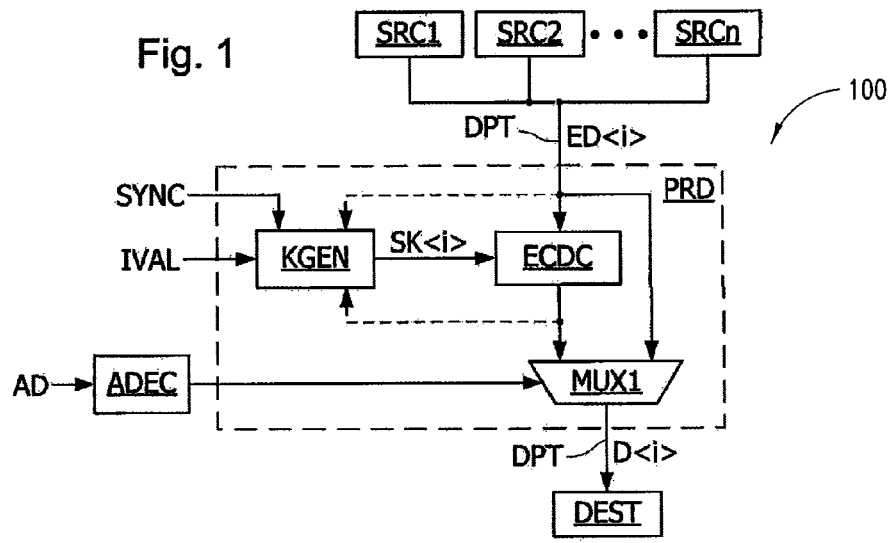
Fig. 1
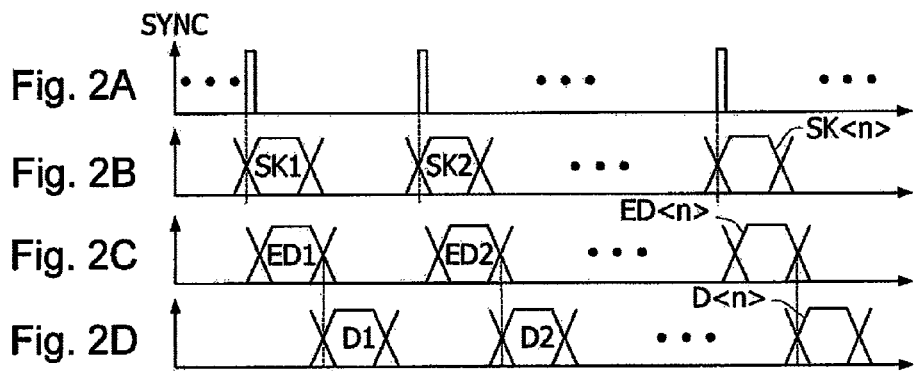
Fig. 2A
Fig. 2B
Fig. 2C
Fig. 2D
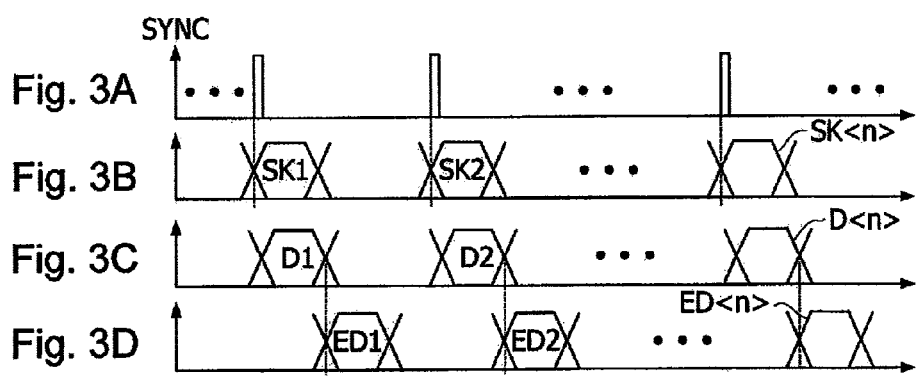
Fig. 3A
Fig. 3B
Fig. 3C
Fig. 3D

COUNTERMEASURE METHOD FOR PROTECTING STORED DATA

BACKGROUND

1. Technical Field

The present disclosure relates to a countermeasure method to protect stored sensitive data from attacks aiming to discover these data. It also relates to a portable microcircuit device implementing the method, such as a chip card.

2. Description of the Related Art

The sensitive data may notably be encryption or decryption keys, and more generally cryptographic data used or developed during cryptographic calculations, such as the intermediary data of such calculations, and identifiers kept secret. These data may be stored in a temporary or permanent manner in registers or memories, volatile such as memories of the RAM type, or non-volatile such as memories of the ROM and EEPROM types.

Microcircuit devices storing such sensitive data are sometimes the object of attacks aiming to determine the data that they handle. Among the known types of attacks, attacks of the type SPA (Simple Power Analysis) or DPA (Differential Power Analysis) comprise measuring the currents and voltages going into and coming out of the microcircuit during the execution of a program by the microcircuit, with the aim of determining the protected data that the microcircuit treated or used. With this same goal, attacks of the type EMA (Electromagnetic Analysis) are based upon the analysis of electromagnetic radiation emitted by the microcircuit. Physical analysis type attacks target circuits such as the memories and registers, of the ROM type, with the aim of determining the data stored during the fabrication of the circuit, or the cryptographic calculation circuits in order to determine the calculations performed.

Also known are fault injection attacks, which consist of introducing disruptions into the microcircuit while it is executing sensitive algorithms such as cryptographic algorithms, or with the aim of launching an uploading routine that emits, upon one of the ports, data that is memorized. Such a disruption may be caused by applying to the microcircuit, on one of its contacts, one or more brief lightings or voltage peaks.

In order to fight against such varied attacks, numerous solutions of different types have been developed. The disclosure relates in particular to those which aim to protect the data stored by a microcircuit, whether they are stored permanently or temporarily.

To this effect, it is known to store sensitive data in an encrypted form by means of an encryption key. In the case of non-volatile memories such as ROM and EEPROM memories, the encryption key may remain unchanged during the entire life of the circuit. In the case of volatile memories (RAM), the encryption key is typically modified for each session, for example in a random manner. No matter what type of memory is used, the previously described attacks may allow the encryption key to be discovered, with the result that all the data encrypted with the encryption key becomes freely accessible.

It is also known to encrypt each sensitive data by using a distinct key stored in a permanent manner in a non-volatile memory, with the result that each address containing a sensitive data is decoded in order to select the corresponding decryption key. This solution therefore uses supplementary circuits to store several encryption keys, to perform the address decoding, and to select the key that corresponds to each sensitive data to be read. Additionally, as the keys are stored in a permanent manner, they may be uploaded fraudulently, with the result that the data become accessible.

BRIEF SUMMARY

Embodiments of the present disclosure relate to a method of read or write access by an electronic component to storage addresses of data, comprising steps of applying a cryptographic operation using a secret key for each data read or to be written, generating a first secret key for a first data of an ordered list of data read or to be written, and for each data of the list, following the first data, generating a distinct secret key by means of a deterministic function applied to a secret key generated for a previous data of the list, the application of the cryptographic operation to each data read or to be written of the list carried out by using the secret key generated for the data.

According to one embodiment, the deterministic function is a generation function of pseudo-random numbers.

According to one embodiment, a secret key is generated by applying the deterministic function to a secret key generated for a previous data of the list, and to the data read or to be written, before or after the application of the cryptographic operation to the previous data.

According to one embodiment, the method comprises steps of comparison of a last data accessed of the list and treated by the cryptographic operation to a reference data, and if the comparison reveals a difference, the electronic component passes into an error state.

According to one embodiment, the generation of a secret key for a data of the list is started by a particular instruction detected before the access to the data, during the execution of a program by the electronic component.

According to one embodiment, the generation of a secret key for a data of the list is started when the address of the data belongs to an ensemble of particular addresses.

According to one embodiment, if a secret key is not generated for an accessed data, the cryptographic operation applied to the accessed data uses a common secret key.

According to one embodiment, the first secret key is generated by applying the deterministic function to an initial value.

According to one embodiment, the method comprises two consecutive read accesses to a same storage address of data, carried out by using two distinct secret keys so that the cryptographic operation supplies two different data.

According to one embodiment, the method comprises two consecutive read accesses to two distinct data storage addresses, carried out by using two distinct secret keys such that the cryptographic operation supplies two identical data.

Embodiments of the present disclosure also relate to an electronic component configured to implement the method according to one of the above embodiments.

According to one embodiment, the electronic component comprises a processor configured to implement the method according to one of the above embodiments.

According to one embodiment, the electronic component comprises a processor, memories connected to the processor by a bus, and a countermeasure device interposed between each memory and the bus and configured to implement the method according to one of the embodiments disclosed herein.

Embodiments of the present disclosure also relate to a microcircuit portable device comprising an electronic component according to one of the above embodiments.

In an embodiment, a method of read or write access by an electronic component to storage addresses of data, comprises a step of applying a cryptographic operation using a secret key for each data read or to be written, comprising steps of: generating a first secret key for a first data of an ordered list of data read or to be written, and for each data of the list, following the first data, generating a distinct secret key by means of a deterministic function applied to a secret key generated for a previous data of the list, the application of the cryptographic operation to each data read or to be written of the list carried out by using the secret key generated for the data. In an embodiment, the deterministic function is a generation function of pseudo-random numbers. In an embodiment, a secret key is generated by applying the deterministic function to a secret key generated for a previous data of the list, and to the data read or to be written, before or after the application of the cryptographic operation to the previous data. In an embodiment, the method comprises steps of comparison of a last data accessed of the list and treated by the cryptographic operation to a reference data, and if the comparison reveals a difference, the electronic component passes into an error state. In an embodiment, the generation of a secret key for a data of the list is started by a particular instruction detected before the access to the data, during the execution of a program by the electronic component. In an embodiment, the generation of a secret key for a data of the list is started when the address of the data belongs to an ensemble of particular addresses. In an embodiment, if a secret key is not generated for an accessed data, the cryptographic operation applied to the accessed data uses a common secret key. In an embodiment, the first secret key is generated by applying the deterministic function to an initial value. In an embodiment, the method comprises two consecutive read accesses to a same storage address of data, carried out by using two distinct secret keys so that the cryptographic operation supplies two different data. In an embodiment, the method comprising two consecutive read accesses to two distinct data storage addresses, carried out by using two distinct secret keys such that the cryptographic operation supplies two identical data.

In an embodiment, a method comprises: generating a first secret key for a first data of an ordered list of data read or to be written by an electronic device; for each data of the list, following the first data, generating a distinct secret key based on a deterministic function; applying a cryptographic operation to each data read or to be written of the list based on the secret key generated for the data, wherein the deterministic function is applied to a secret key generated for a previous data of the list and at least one of: the previous data; and a result of application of the cryptographic operation to the previous data; comparing a result of application of the cryptographic operation to a last data of the ordered list to a reference data; and selectively causing the electronic device to enter an error state based on the comparison. In an embodiment, the deterministic function is a generation function of pseudo-random numbers. In an embodiment, when the comparison reveals a difference, the electronic device passes into the error state. In an embodiment, the generation of a secret key for a data of the list is started by a particular instruction detected before the access to the data, during the execution of a program by the electronic device. In an embodiment, the generation of a secret key for a data of the list is started when an address of the data belongs to an ensemble of particular addresses. In an embodiment, if a secret key is not generated for an accessed data, the cryptographic operation applied to the accessed data uses a common secret key. In an embodiment, the first secret key is generated by applying the deterministic function to an initial value. In an embodiment, the method comprises performing two consecutive read accesses to a same storage address of data, carried out by using two distinct secret keys so that the cryptographic operation supplies two different data. In an embodiment, the method comprises performing two consecutive read accesses to two distinct data storage addresses, carried out by using two distinct secret keys such that the cryptographic operation supplies two identical data.

In an embodiment, an electronic device comprises: a key generator configured to: generate a first secret key for a first data of an ordered list of data read or to be written by the electronic device; and for each data of the list, following the first data, generate a distinct secret key based on a deterministic function; a cryptographic unit coupled to the key generator and configured to apply a cryptographic operation to each data read or to be written of the list based on the secret key generated for the data, wherein the deterministic function is applied to a secret key generated for a previous data of the list and at least one of: the previous data; and a result of application of the cryptographic operation to the previous data; and a comparator configured to: compare a result of application of the cryptographic operation to a last data of the ordered list to a reference data; and control a state of the electronic device based on the comparison. In an embodiment, the deterministic function is a generation function of pseudo-random numbers. In an embodiment, the comparator is configured to generate a signal to cause the electronic device to enter an error state when the comparison reveals a difference. In an embodiment, the electronic device further comprises a processor configured to execute instructions, wherein the generation of a secret key for a data of the list is started by a particular instruction detected before the access to the data, during the execution of a program by the electronic device. In an embodiment, the electronic device further comprises an address decoder, wherein the key generator is configured to start generation of a secret key for a data of the list when the address decoder determines an address of the data belongs to an ensemble of particular addresses. In an embodiment, the key generator is configured to generate the first secret key by applying the deterministic function to an initial value. In an embodiment, the cryptographic unit is configured to perform two consecutive cryptographic operations on data associated with a single storage address, carried out by using two distinct secret keys, producing two different output data. In an embodiment, the cryptographic unit is configured to perform two consecutive cryptographic operations on data associated with two distinct data storage addresses, carried out by using two distinct secret keys, producing identical output data.

In an embodiment, a system, comprises: a processor; a memory; a countermeasure device coupled between the processor and the memory, the countermeasure device comprising: a key generator configured to: generate a first secret key for a first data of an ordered list of data to be transferred between the processor and the memory; and for each data of the list, following the first data, generate a distinct secret key based on a deterministic function; and a cryptographic unit coupled to the key generator and configured to apply a cryptographic operation to each data of the list based on the secret key generated for the data, wherein the deterministic function is applied to a secret key generated for a previous data of the list and at least one of: the previous data; and a result of application of the cryptographic operation to the previous data; and an error detector configured to: compare a result of application of the cryptographic operation to a last data of the ordered list to a reference data; and control a state of the system based on the comparison. In an embodiment, the error detector is configured to generate a signal to cause the electronic device to enter an error state when the comparison reveals a difference. In an embodiment, the generation of a secret key for a data of the list is started by a particular instruction detected before the access to the data, during the execution of a program by the processor. In an embodiment, the system further comprises an address decoder, wherein the key generator is configured to start generation of a secret key for a data of the list when the address decoder determines an address of the data belongs to an ensemble of particular addresses. In an embodiment, the cryptographic unit is configured to perform two consecutive cryptographic operations on data associated with a single storage address, carried out by using two distinct secret keys, producing two different output data. In an embodiment, the cryptographic unit is configured to perform two consecutive cryptographic operations on data associated with two distinct data storage addresses, carried out by using two distinct secret keys, producing identical output data.

In an embodiment, a device comprises: means for generating a first secret key for a first data of an ordered list of data, and, for each data of the list following the first data, generating a distinct secret key based on a deterministic function; means for applying a cryptographic operation to each data read or to be written of the list based on the secret key generated for the data, wherein the deterministic function is applied to a secret key generated for a previous data of the list and at least one of: the previous data; and a result of application of the cryptographic operation to the previous data; and means for causing the device to enter an error state when a result of application of the cryptographic operation to a last data of the ordered list differs from a reference data. In an embodiment, the device further comprises: means for activating the means for generating. In an embodiment, the device further comprises: means for supplying the means for applying a cryptographic operation with a fixed key or a key generated by the means for generating. In an embodiment, the device further comprises: means for selecting between an output and an input of the means for applying a cryptographic operation.

BRIEF DESCRIPTION OF THE SEVERAL VIEWS OF THE DRAWINGS

Embodiments of the disclosure will be described in the following description, in a non-limiting manner in relation with the appended figures wherein:

FIG. 1 shows schematically a countermeasure device to protect data stored in an electronic component, according to one embodiment, FIGS. 2A to 2D are timing diagrams showing steps of a read access of protected data in the electronic component, according to one embodiment, FIGS. 3A to 3D are timing diagrams showing steps of a write access of protected data in the electronic component, according to one embodiment.

DETAILED DESCRIPTION

Figure 4:
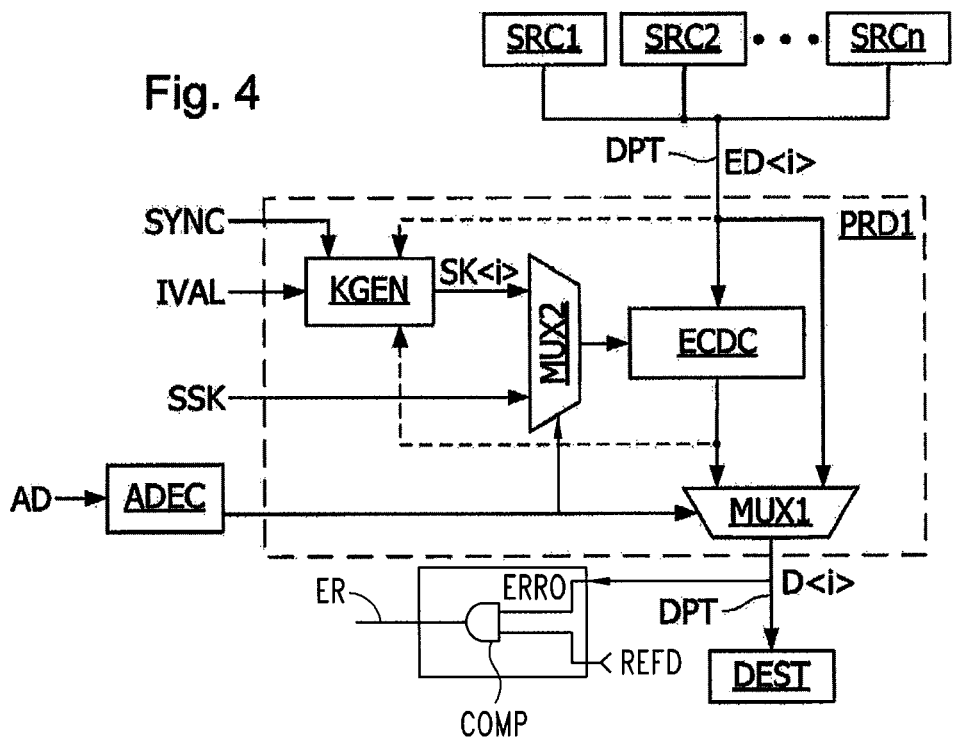
FIG. 4 shows schematically a countermeasure device to protect data stored in an electronic component, according to another embodiment.

In the following description, numerous specific details are given to provide a thorough understanding of embodiments. The embodiments can be practiced without one or more of the specific details, or with other methods, components, materials, etc. In other instances, well-known structures, materials, or operations, such as, for example, processors, memories and multiplexers, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

FIG. 1 shows a data path DPT in an embodiment of an electronic component 100, between data sources SRC1, SRC2, . . . SRCn and a destination DEST. A countermeasure device PRD to protect the data stored in the electronic component is interposed on the path DPT. The sources SRC1-SRCn and the destination DEST are for example addresses in a memory and/or registers, belonging to the component itself or external to the component. The device PRD comprises a cryptographic calculation unit ECDC interposed on the data path DPT between the data sources SRC1-SRCn and the destination DEST. The unit ECDC applies a cryptographic operation to a data ED<i> received and supplies a transformed data D<i>. The cryptographic operation may be an encryption or decryption operation, for example of a symmetric type. The device PRD may also comprise a multiplexer MUX1 comprising an input connected to a data output of the unit ECDC, one input connected to data sources SRC1-SRCn and one output connected to the destination DEST. The multiplexer MUX1 is controlled by an address decoder ADEC receiving on input a source or destination address AD of a data ED<i> transferred in the path DPT. The multiplexer MUX1 thus optionally allows to encrypt/decrypt or to let a data ED<i> circulate in the path DPT without being encrypted/decrypted, depending on the address of the source or of the destination of the data, or both.

According to one embodiment, the countermeasure device PRD also comprises a key generation unit KGEN supplying secret keys SK<i> to a key input of the unit ECDC. The unit ECDC is configured to encrypt or decrypt each data ED<i> received with the last key SK<i> received from the unit KGEN. The unit KGEN receives a synchronization signal that starts the supply of a key SK<i> to the unit ECDC. The unit KGEN is configured to generate a first key SK1 by applying a deterministic function PRF to an initial value IVAL, and to generate a new key SK<n+1> by applying this deterministic function to the previously generated key SK<n>:

$$SK1=PRF(IVAL) \qquad (1)$$

$$SK<n+1>=PRF(SK<n>) \qquad (2)$$

The deterministic function PRF employed by the unit KGEN to generate the keys SK<i> may be a pseudo-random number generation function. Such a function may combine logic operations such as shifts, addition and/or multiplication. It may for example be performed by means of a Linear Feedback Shift Register (LFSR). It may also be performed by means of a substitution table SBOX such as those used in symmetric encryption algorithms, the substitution table being looped back upon itself such that the next state of the table depends upon its previous state. The signal SYNC may be emitted by the address decoder ADEC when an address or a specific zone of addresses is accessed. It may also be emitted, during the reading of a particular instruction code, by a processor of the electronic component executing a program.

The protected data ED<i> are accessed in a deterministic order, generally defined by the program executed by the electronic component. It suffices therefore to encrypt and store in the electronic component the protected data in the order in which they will be read by the electronic component, by using the keys obtained by the deterministic function implemented by the unit KGEN, from a same initial value also stored in the electronic component. The unit ECDC may be made by simple logic gates exclusive OR (XOR), each combining a bit of a data to encrypt or to decrypt ED<i> with a respective bit of a key SK<i>.

The FIGS. 2A, 2B, 2C and 2D are respective timing diagrams of the signal SYNC, of a signal supplied to a key input of the unit ECDC, of a signal supplied to a data input of the unit ECDC, and of a signal of data output from the unit ECDC, for example in the case of an encrypted data read. In FIG. 2A, the signal SYNC comprises pulses that are emitted by the component at instants when a data is to be decrypted by the unit ECDC. At each pulse of signal SYNC, the unit KGEN generates a key SK1, SK2, ... SK<n> that it transmits to the unit ECDC (FIG. 2B). Similarly, the unit ECDC receives a data to decrypt ED1, ED2, ... ED<n> (FIG. 2C) and decrypts it by using the last key received. Therefore, the unit ECDC supplies decrypted data D1, D2, ... DSK<n> (FIG. 2D) corresponding to the encrypted data ED1, ED2, ... ED<n> received.

FIGS. 3A, 3B, 3C and 3D are timing diagrams respectively of the signal SYNC, of the signal supplied to a key input of the unit ECDC, of the signal supplied to a data input of the unit ECDC, and of the signal of data output from the unit ECDC, for example in the case of a data write. At each pulse of signal SYNC shown in FIG. 3A, the unit KGEN generates a key SK1, SK2, ... SK<n> that it transmits to the unit ECDC (FIG. 3B). Similarly, the unit ECDC receives a data to encrypt D1, D2, ... D<n> (FIG. 3C) and encrypts it by using the last key received. Therefore, the unit ECDC supplies encrypted data ED1, ED2, ... ED<n> (FIG. 3D) corresponding to un-encrypted data D1, D2, ... D<n> received.

In the case of sensitive data stored in a non-volatile memory, the order in which these data will be read is defined by the program executed by the electronic component. This order, which defines an ordered list of accessed addresses, is respected to define with which secret key SK<i>, generated by the unit KGEN, each data to be written is encrypted before it is written in the memory. For the reading of sensitive data thus stored, the unit KGEN is first initialized with the same initial value as that used for the encryption of the stored data. At each address read of a stored data, the unit KGEN supplies a new secret key to be used to decrypt the data read.

To store sensitive data in a volatile memory, the unit KGEN may be initialized with a randomly generated initial value. Then, each sensitive data to be written in the memory is encrypted beforehand by means of a new secret key generated by the unit KGEN. To access sensitive data thus stored in the volatile memory, the unit KGEN is first initialized with the initial value used during the writing of the sensitive data in the volatile memory. The sensitive data are then read and decrypted in the order in which they were stored in the memory, by using a new secret key generated by the unit KGEN at each read of a sensitive data. The initial value used by the unit KGEN is therefore different for each session of the electronic component, or for each write access in the volatile memory.

Thanks to these arrangements, a fraudulent access of protected data requires the determination of the non-volatile memory zone where the initial value IVAL is stored and the analysis of this memory zone, the analysis of the key generation unit KGEN to determine the deterministic function used, the analysis of the unit ECDC to determine the encryption algorithm implemented, the localization of the memory zones where the protected data are stored and the analysis of these zones in order to extract the encrypted data. If a data uploading operation from a memory is fraudulently launched, it seems that it would be difficult to initialize at the same time the unit KGEN with the correct initial value and to correctly synchronize it in order to decrypt the uploaded data. In addition, the countermeasure device PRD may be made on a relatively small integrated circuit area, and may only impose during the writing of the program executed by the electronic component so as to determine the access order of the protected data, and to control the initialization of the unit KGEN with the initial value used during the writing of the protected data.

It is to be noted that during the functioning of the electronic component, the unit KGEN may be initialized several times with different values. It may also be provided to not use all the keys generated by the unit KGEN by sending several synchronization pulses to it without activating the unit ECDC to encrypt or decrypt a data.

In embodiments shown in FIG. 1 as broken lines, the key generation unit KGEN calculates a new key as a function of a previous key and of a data previously supplied as input of the unit ECDC or on output of this latter:

$$SK1 = PRF(IVAL) \text{ and} \tag{3}$$

$$SK<n+1> = PRF(SK<n>, D<n>) \text{ or else} \tag{4}$$

$$SK<n+1> = PRF(SK<n>, ED<n>) \tag{5}$$

In these embodiments, the data is known ahead of time. In this manner, it is possible to verify that no data of an ordered list of data read was fraudulently modified by comparing a last data of the list, read and treated by the unit ECDC, with a reference value. These embodiments equally allow for the protection of data from a fault injection attack DFA (Differential Fault Analysis) aiming to modify the value of the data treated by the component.

FIG. 4 shows a countermeasure device PRD1 according to another embodiment. In FIG. 4, the device PRD1 differs from device PRD shown in FIG. 1 in that it comprises a second multiplexer MUX2 interposed between the key generation unit KGEN and the cryptographic calculation unit ECDC. The multiplexer MUX2 sends to the unit ECDC either a key SK<i> supplied by the unit KGEN, or else a fixed key SSK provided to encrypt less sensitive data, as a function of the address AD of the data read or to store. To this effect, the multiplexer MUX2 is controlled by a signal from the address decoder ADEC. Here again, the unit KGEN may or may not use the data previously treated by the unit ECDC, before or after encryption or decryption. FIG. 4 also shows an error detector ERRO comprising a comparator COMP configured to compare an output of the cryptographic calculation unit ECDC of a last data in a list of data to reference data REFD, and to generate an output signal ER based on the comparison. In an embodiment, when the comparison indicates a difference, the signal ER causes the device or a system including the device to enter an error state.

Figure 5:
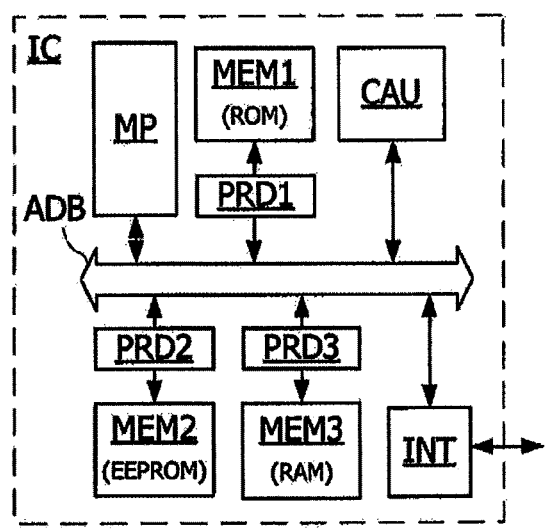
FIG. 5 shows an electronic component equipped with a countermeasure device, according to one embodiment.

FIG. 5 shows an electronic component IC comprising a processor MP, for example of the microprocessor or microcontroller type, memories MEM1, MEM2, MEM3, an interface unit INT allowing the component to communicate with external equipment, and address and data buses ADB to which the processor, the memories, and the interface unit are connected. The memories MEM1, MEM2 are for example non-volatile memories and the memory MEM3 a volatile memory for example of the type RAM. The memories MEM1 and MEM2 are for example of the type ROM and EEPROM. The component IC may also comprise cryptographic calculation circuits CAU also connected to the buses ADB.

According to one embodiment, the electronic component IC comprises countermeasure devices PRD1, PRD2, PRD3 such as those previously described in reference to FIG. 1 or 4, interposed between each of the memories MEM1, MEM2, MEM3 and the address bus ADB. In an embodiment, each of devices PRD1, PRD2, PRD3 comprises its own key generation unit KGEN. In another embodiment, one unit KGEN may be shared by two or more of the countermeasure devices PRD1, PRD2, PRD3, to supply a secret key to the cryptographic calculation units ECDC of each of the countermeasure devices, as a sensitive data is accessed in one or another of the memories MEM1, MEM2, MEM3.

In a data path between two memories of component IC, for example between a non-volatile memory MEM1, MEM2 and a volatile memory MEM3, several encryption/decryption operations may be performed. Thus, data read in the memory MEM1 or MEM2 may be decrypted by the device PRD1 or PRD2 and encrypted with other keys by the device PRD3.

Figure 6:
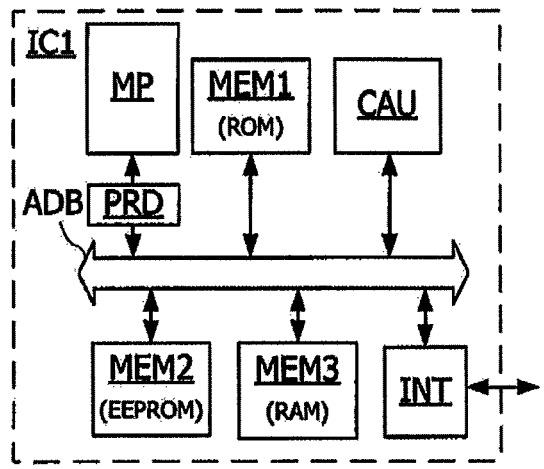
FIG. 6 shows an electronic component equipped with a countermeasure device, according to another embodiment.

FIG. 6 shows an electronic component 101 according to another embodiment. The component 101 only differs from component IC in that it comprises only one countermeasure device PRD interposed between the processor MP and the bus ADB. In this manner, the sensitive data read in the memories are transmitted by the data bus in an encrypted form and are decrypted just before being used by the processor MP. The sensitive data supplied by the processor MP are encrypted before being transmitted by the data bus to be stored in an encrypted form in a memory or a register.

Figure 7:
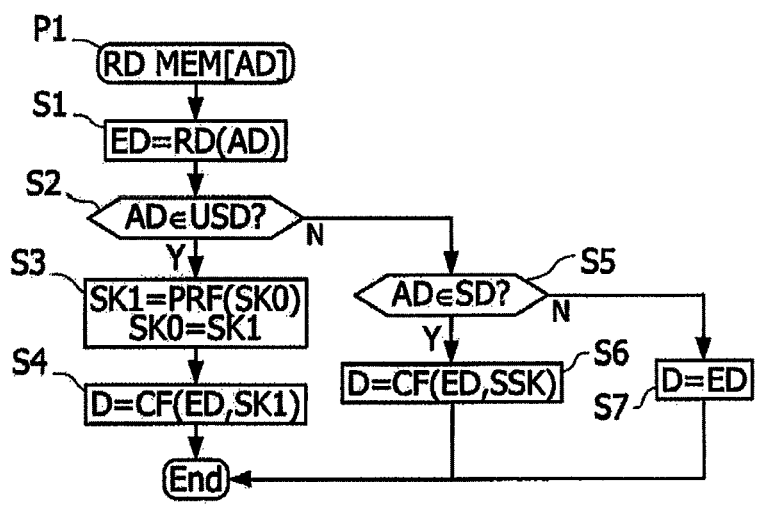
FIG. 7 is a chart showing steps of a read access of stored data, according to one embodiment.
Figure 8:
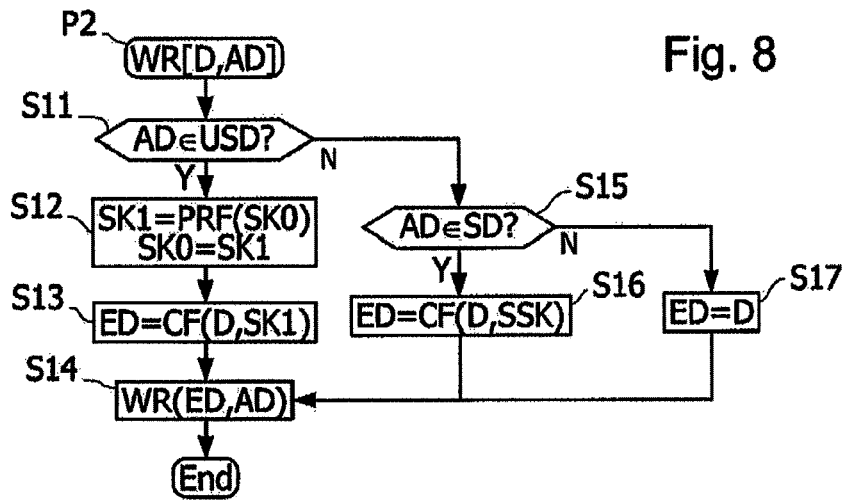
FIG. 8 is a chart showing steps of a write access of stored data, according to one embodiment.

Additionally, all or part of the countermeasure device may be implemented in a program executed by the processor MP. Thus, FIGS. 7 and 8 show sequences of steps of a countermeasure method according to one embodiment. FIG. 7 shows a read sequence P1 of a data stored at an address AD. The sequence P1 comprises steps S1 to S7. At step S1, the processor MP reads a data ED at the address AD. At step S2, if the read address corresponds to a stored address of a sensitive data, the processor executes steps S3 and S4, otherwise it executes step S5. At step S3, the processor orders the generation of a new key SK1, as a function of a previous key SK0, and the new key SK1 is stored as the previous key SK0. If the key SK1 is the first key of an ordered list of generated keys, the key SK0 is initialized with an initial value IVAL before the sequence P1 is executed. The initial value IVAL is that which was used to initialize the sequence of keys used during the writing of the data to be read. At step S4, the processor orders the decryption of the data ED, by means of the key SK1, to obtain a decrypted data D. At step S5, if the read address belongs to addresses of less sensitive yet still encrypted data, the processor executes step S6, otherwise it executes step S7. At step S6, the processor MP decrypts the data ED to obtain a decrypted data D, by using a key SSK used to encrypt all or part of the less sensitive yet still encrypted data. At step S7, the data ED read in the memory correspond to the data decrypted D. The sequence P1 of steps finishes at the end of step S4, S6 or S7 by the supply of non-encrypted data D.

FIG. 8 shows a write sequence P2 of a data D at an address AD. The sequence P2 comprises steps S11 to S17. At step S11, the processor MP determines whether the write address corresponds to a storage address of a sensitive data. If so, then the processor executes the steps S12 to S14, otherwise it executes the step S15. At step S12, the processor orders the generation of a new key SK1 to be used to encrypt the data D as a function of a previous key SK0, and the new key SK1 is stored as the previous key SK0. If the key SK1 is the first key of an ordered list of generated keys, the key SK0 is initialized at an initial value IVAL before the execution of the sequence P2. At step S13, the processor encrypts the data D by means of the key SK1 to obtain an encrypted data ED. At step S14, the processor MP writes the encrypted data ED at the address AD. At step S15, if the data belongs to an ensemble of less sensitive yet still encrypted data, the processor executes step S16, otherwise it executes step S17. At step S16, the processor MP encrypts the data D to obtain an encrypted data ED, by using the key SSK used to encrypt all or part of the less sensitive yet still encrypted data. At step S17, the data D to store correspond to the data ED to be written at address AD. At the end of steps S16 and S17, the processor MP executes step S14 to write the data ED at the address AD. The sequence P2 of steps finishes at the end of step S14.

At steps S3 and S12, the calculation of a new key may be completely done by the processor or by an external circuit, for example by the circuit CAU. Similarly, the decryption and encryption operations performed at steps S4, S6, S13 and S16 may be done by the processor MP or by an external circuit, such as the circuit CAU. Additionally, it may be noted that at steps S3 and S12, the emission of the signal SYNC may be not necessary. For example, the processor MP itself may order a new key SK1 each time a sensitive data is to be encrypted or decrypted. The steps S3 and S12 may also be replaced by the emission of the synchronization signal SYNC to start the generation of a new key.

Figure 9:
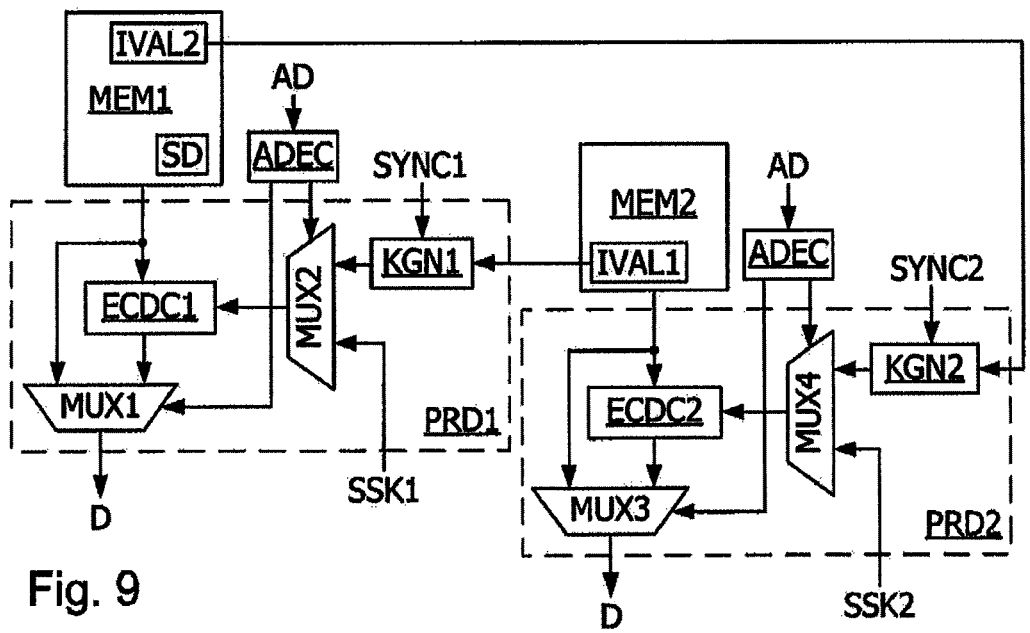
FIG. 9 shows schematically two memories of the electronic component, protected by an embodiment of a countermeasure device.

FIG. 9 shows the memories MEM1, MEM2 of the electronic component of FIG. 6, protected by countermeasure devices PRD1, PRD2, such as that shown in FIG. 4. Thus, the device PRD1 comprises a cryptographic calculation unit ECDC1, multiplexers MUX1, MUX2, and a key generation unit KGN1. The unit ECDC1 is connected to a data output of the memory MEM1. The multiplexer MUX1 comprises an input connected to a data output of the unit ECDC1, an input connected to a data output of the memory MEM1, and a data D output. The multiplexer MUX2 sends to the unit ECDC1 either a key supplied by the unit KGN1, or else a fixed key SSK1 common to several protected data. The unit KGN1 is initialized by an initial value IVAL1 stored in the memory MEM2.

Similarly, the device PRD2 comprises a cryptographic calculation unit ECDC2, multiplexers MUX3, MUX4, and a key generation unit KGN2. The unit ECDC2 is connected to a data output of the memory MEM2. The multiplexer MUX3 comprises an input connected to a data output of the unit ECDC2, an input connected to the data output of the memory MEM2, and a data D output. The multiplexer MUX4 sends to the unit ECDC2 either a key supplied by the unit KGN2, or else a fixed key SSK2 common to several protected data. The unit KGN2 is initialized by an initial value IVAL2 stored in the memory MEM1. The units KGN1, KGN2 are synchronized by signals SYNC1, SYNC2, which may be identical or different.

To discover a data SD stored in the memory MEM1, it is first necessary to know the initial value IVAL1 stored in the memory MEM2. It is also necessary to know the encryption algorithm implemented by the unit ECDC1 and the algorithm implemented by the unit KGN1. If the initial value IVAL1 is encrypted by means of an encryption key generated by the unit KGN2, it is also necessary to know the encryption algorithm implemented by the unit ECDC2 and the algorithm implemented by the unit KGN2, as well as the initial value IVAL2 used by the unit KGN2. The initial value IVAL2 may be stored in the memory MEM1 in an encrypted form by means of the key SSK1. It is therefore necessary to also know this key. In other words, the access to a sensitive data requires the knowledge of a large number of the circuits of the electronic component as well as the stored data.

Certain cryptographic calculations, such as 3-DES (Data Encryption Standard), use two cryptographic keys. An embodiment of a device according to the disclosure allows for the reading of two different keys at the same addresses of the memory, by using different decryption keys SK supplied by the unit KGEN, that is to say generated from different previous values. Thus, the two cryptographic keys may be obtained by reading two times the address or the same addresses and by starting the generation of a new decryption key for each read. In other words, the electronic component may read two different data at the same storage address. In this manner, the electronic component IC, IC1 emits identical electromagnetic signatures and electrical consumption signatures during the reading of two cryptographic keys.

In an embodiment, a countermeasure device according to the disclosure may also allow the storage of a same cryptographic key at two different addresses in the form of two different values resulting from an encryption using two different keys generated by the unit KGEN from different previous values. In this manner, a cryptographic key may be accessed several times at different addresses, while the electronic component emits different electromagnetic and electrical consumption signatures.

It will clearly appear to the skilled person that embodiments of the present disclosure are susceptible to diverse implementation variations and applications. In particular, the disclosure is not limited to a deterministic function supplying a new secret key as a function of a previously generated secret key, and if necessary, of a data previously encrypted or decrypted. Indeed, the deterministic function may also relate to, for example, a second previously generated secret key and/or any other determinable value, such as an order number in the ordered list of secret keys generated, or the address of the last data accessed or of the previous data accessed.

Moreover, the access method previously described does not require that the accessed addresses be consecutive or accessed in an increasing or deceasing order of their respective values, or that the data be accessed in a certain order. It only matters that the order in which the data were written at these addresses is determinable and that this order is taken into consideration during the read access of these addresses, so that the secret key used to decrypt a data read is that which was used to encrypt the data. It also is not necessary to read all the data written during a write sequence. Indeed, if a data does not need to be read, it suffices to request two times the generation of a key by the unit KGEN to be able to access the following data in the sequence. More generally, the data protected by a key generated by the unit KGEN may be read in any order, as long as the order in which these data were written is known, that is to say the rank of their encryption key in the ordered list of generated keys. In fact, each data may be read and decrypted by ordering the initialization of the unit KGEN with the initial value IVAL and by ordering the generation of a key a number of times corresponding to the rank in the list of generated keys of the encryption key of the data. Each data may be equally read and decrypted by means of a key obtained by initializing the unit KGEN with the value of the key SK<n> having a rank n in the list of generated keys, immediately less than that n+1 of the key SK<n+1> to be used to decrypt the data to be read, by application of the formula (2).

The cryptographic operation performed by the cryptographic calculation unit ECDC is not necessarily an encryption or decryption operation. Indeed, this operation may also perform a signature calculation. The unit ECDC may apply the same cryptographic function to encrypt and to decrypt a data or apply different functions.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating a first secret key for a first data of an ordered list of data read or to be written by an electronic device;
for each data of the list, following the first data, generating a distinct secret key based on a deterministic function;
applying a cryptographic operation to each data read or to be written of the list based on the secret key generated for the data, wherein the deterministic function is applied to a secret key generated for a previous data of the list and at least one of:
the previous data; and
a result of application of the cryptographic operation to the previous data;
comparing a result of application of the cryptographic operation to a last data of the ordered list to a reference data; and
selectively causing the electronic device to enter an error state based on the comparison, wherein the generation of a secret key for a data of the list is started by a particular instruction detected before the access to the data, during the execution of a program by the electronic device.

2. The method according to claim 1 wherein the deterministic function is a generation function of pseudo-random numbers.

3. The method according to claim 1 wherein when the comparison reveals a difference, the electronic device passes into the error state.

4. The method according to claim 1 wherein the generation of a secret key for a data of the list is started when an address of the data belongs to an ensemble of particular addresses.

5. The method according to claim 1 wherein if a secret key is not generated for an accessed data, the cryptographic operation applied to the accessed data uses a common secret key.

6. The method according to claim 1 wherein the first secret key is generated by applying the deterministic function to an initial value.

7. The method according to claim 1, comprising two consecutive read accesses to a same storage address of data, carried out by using two distinct secret keys so that the cryptographic operation supplies two different data.

8. The method according to claim 1, comprising two consecutive read accesses to two distinct data storage addresses, carried out by using two distinct secret keys such that the cryptographic operation supplies two identical data.

9. The method of claim 1 wherein the deterministic function is applied to the result of application of the cryptographic operation to the previous data.

10. An electronic device, comprising:
a key generator configured to:
generate a first secret key for a first data of an ordered list of data read or to be written by the electronic device; and
for each data of the list, following the first data, generate a distinct secret key based on a deterministic function;
a cryptographic unit coupled to the key generator and configured to apply a cryptographic operation to each data read or to be written of the list based on the secret key generated for the data, wherein the deterministic function is applied to a secret key generated for a previous data of the list and at least one of: the previous data; and
a result of application of the cryptographic operation to the previous data;
a comparator configured to:
compare a result of application of the cryptographic operation to a last data of the ordered list to a reference data; and
control a state of the electronic device based on the comparison, wherein the electronic device includes one or more processing devices configured to implement the key generator, the cryptographic unit and the comparator;
a memory storing instructions; and
a processor configured to execute the instructions, wherein the generation of a secret key for a data of the list is started by a particular instruction detected before the access to the data, during the execution of a program by the electronic device.

11. The electronic device of claim 10 wherein the deterministic function is a generation function of pseudo-random numbers.

12. The electronic device of claim 10 wherein the comparator is configured to generate a signal to cause the electronic device to enter an error state when the comparison reveals a difference.

13. The electronic device of claim 10, further comprising an address decoder, wherein the key generator is configured to start generation of a secret key for a data of the list when the address decoder determines an address of the data belongs to an ensemble of particular addresses.

14. The electronic device of claim 10 wherein the key generator is configured to generate the first secret key by applying the deterministic function to an initial value.

15. The electronic device of claim 10 wherein the cryptographic unit is configured to perform two consecutive cryptographic operations on data associated with a single storage address, carried out by using two distinct secret keys, producing two different output data.

16. The electronic device of claim 10 wherein the cryptographic unit is configured to perform two consecutive cryptographic operations on data associated with two distinct data storage addresses, carried out by using two distinct secret keys, producing identical output data.

17. A system, comprising:
a processor;
a memory;
a countermeasure device coupled between the processor and the memory, the countermeasure device comprising:
a key generator configured to:
generate a first secret key for a first data of an ordered list of data to be transferred between the processor and the memory; and
for each data of the list, following the first data, generate a distinct secret key based on a deterministic function; and a cryptographic unit coupled to the key generator and configured to apply a cryptographic operation to each data of the list based on the secret key generated for the data, wherein the deterministic function is applied to a secret key generated for a previous data of the list and at least one of:
the previous data; and
a result of application of the cryptographic operation to the previous data; and
an error detector configured to:
compare a result of application of the cryptographic operation to a last data of the ordered list to a reference data; and
control a state of the system based on the comparison, wherein the generation of a secret key for a data of the list is started by a particular instruction detected before the access to the data, during the execution of a program the processor.

18. The system of claim 17 wherein the error detector is configured to generate a signal to cause the electronic device to enter an error state when the comparison reveals a difference.

19. The system of claim 17, further comprising an address decoder, wherein the key generator is configured to start generation of a secret key for a data of the list when the address decoder determines an address of the data belongs to an ensemble of particular addresses.

20. The system of claim 17 wherein the cryptographic unit is configured to perform two consecutive cryptographic operations on data associated with a single storage address, carried out by using two distinct secret keys, producing two different output data.

21. The system of claim 17 wherein the cryptographic unit is configured to perform two consecutive cryptographic operations on data associated with two distinct data storage addresses, carried out by using two distinct secret keys, producing identical output data.

22. The system of claim 17 wherein the deterministic function is applied to the result of application of the cryptographic operation to the previous data.

23. A device, comprising:
means for generating a first secret key for a first data of an ordered list of data, and, for each data of the list following the first data, generating a distinct secret key based on a deterministic function;
means for applying a cryptographic operation to each data read or to be written of the list based on the secret key generated for the data, wherein the deterministic function is applied to a secret key generated for a previous data of the list and at least one of:
the previous data; and
a result of application of the cryptographic operation to the previous data;
means for causing the device to enter an error state when a result of application of the cryptographic operation to a last data of the ordered list differs from a reference data, and
means for activating the means for generating, wherein the generation of a secret key for a data of the list is started by a particular instruction detected before access to the data, during execution of a program by means for activating.

24. The device of claim 23, further comprising:
means for supplying the means for applying a cryptographic operation with a fixed key or a key generated by the means for generating.

25. The device of claim 23, further comprising:
means for selecting between an output and an input of the means for applying a cryptographic operation.

\* \* \* \* \*